(12) United States Patent
Kubota et al.

(10) Patent No.: US 6,771,331 B1
(45) Date of Patent: Aug. 3, 2004

(54) LIGHTING DEVICE AND LIQUID CRYSTAL DISPLAY

(75) Inventors: Hirofumi Kubota, Nishinomiya (JP); Kenji Nakao, Osaka (JP); Tsuyoshi Uemura, Kadoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/562,726

(22) Filed: May 1, 2000

(30) Foreign Application Priority Data

Apr. 30, 1999 (JP) .......................................... 11-123721

(51) Int. Cl.[7] .......................................... G02F 1/1335
(52) U.S. Cl. .............................. 349/62; 349/64; 349/65
(58) Field of Search ..................................... 349/61–65

(56) References Cited

U.S. PATENT DOCUMENTS 4,265,516 A * 5/1981 Greubel et al. ............. 349/103
5,608,837 A * 3/1997 Tai et al. ..................... 385/146

FOREIGN PATENT DOCUMENTS

| JP | 08-149346 | 6/1996 |
|---|---|---|
| JP | 08304821 | 11/1996 |
| JP | 09160028 | 6/1997 |
| JP | 09-297305 | 11/1997 |
| JP | 10068948 | 3/1998 |
| JP | 10-123507 | 5/1998 |
| JP | 10-268297 | 10/1998 |

* cited by examiner

*Primary Examiner*—Dung Nguyen
(74) *Attorney, Agent, or Firm*—Parkhurst & Wendel, L.L.P.

(57) ABSTRACT

In a liquid crystal display device configured so that ambient light is collected and the collected ambient light is guided to the back of a liquid crystal panel so as to illuminate the liquid crystal panel, a light-collecting unit 17 and a light-guiding unit 18 are provided. The light-collecting unit 17 collects and captures ambient light, and converts the ambient light into a transmitting light which transmits in the light-collecting unit 17. The light-guiding unit 18 connected to the light-collecting unit 17 redirects a light path of the transmitting light from the light-collecting unit 17 so that the transmitting light proceeds to the back of a liquid crystal panel 15. Thus, unlike conventional light-collecting units, a light-collecting unit of the invention is composed of two separated units, one being a light-collecting unit for converting ambient light into a transmitting light and the other being a light-guiding unit for guiding the transmitting light to the liquid crystal panel. This configuration attains an increase in an occupied area of the light-collecting unit and thereby achieves an increased brightness of the liquid crystal display device.

14 Claims, 13 Drawing Sheets

LIGHTING DEVICE AND LIQUID CRYSTAL DISPLAY

BACKGROUND OF THE INVENTION

(1) Field of the Invention

The present invention relates to a lighting device in which ambient light collected and captured in a light-collecting unit is converted into a transmitting light and guided to an object to be illuminated. The present invention also relates to a liquid crystal display device provided with the lighting device.

(2) Description of the Prior Art

Liquid crystal display panels are widely utilized for an information display unit in camcorders, digital cameras, and the like. For such liquid crystal display devices, generally, transmissive-type liquid crystal display panels have been employed. In a display panel for such appliances as camcorders and digital cameras, it is necessary to prevent a display defect caused by ambient light incident on the panels, since such appliances are often used under strong ambient light. Accordingly, it is essential that liquid crystal display panels used for such appliances have a high luminance. In view of this, Japanese Unexamined Patent Publication No. 10-123507 discloses an apparatus having the following configuration. In the apparatus, a light-collecting unit for collecting ambient light is provided on an upper face of the apparatus, and the ambient light collected in the light-collecting unit is guided to a back surface of a liquid crystal display panel using microprisms so as to illuminate the liquid crystal display panel from the back surface of the panel, for the purpose of increasing a brightness of the liquid crystal display panel.

However, in the above-described device of prior art, the light-collecting unit is placed at the back of the liquid crystal display panel and formed in a rectangular-like shape on the upper face of the apparatus, and ambient light is directly guided to the back surface of the liquid crystal display panel. Therefore, the light-collecting unit cannot be made large, restricted to a relatively small area of a rectangular-like shape. It is noted here that the size of an area of the light-collecting unit directly influences a brightness of the display panel. Accordingly, the prior art device has at least a drawback that the improvement in brightness is insufficient since the light-collecting unit cannot be made large.

SUMMARY OF THE INVENTION

In view of the foregoing and other drawbacks in prior art, it is an object of the present invention to provide a lighting device and a liquid crystal display device in which, unlike conventional light-collecting units, two separate units each having a different function (i.e., a light-collecting unit for collecting and capturing ambient light, and a light-guiding unit, connected to the light-collecting unit, for guiding the light to a liquid crystal display panel) are provided to increase an occupied area of the light-collecting unit and thereby to achieve an increased brightness.

These and other objects are accomplished by providing a lighting device capable of utilizing ambient light for illuminating an object to be illuminated, comprising:

a light-collecting unit for collecting ambient light, and means for converting at least a part of the ambient light into a transmitting light transmitted in the light-collecting unit, the means for converting being provided in the light-collecting unit.

By employing such a configuration, ambient light is captured and converted into a transmitting light in the light-collecting unit, and thereby ambient light is efficiently guided to the object to be illuminated.

The above-described lighting device according to the invention may further comprise a plurality of means for redirecting a proceeding direction of light, provided in a light path between the light-collecting unit and the object to be illuminated, and may be such a device in which a proceeding direction of the ambient light emitted from the light-collecting unit is redirected a plurality of times by the means for redirecting, so that the ambient light is guided to the object to be illuminated.

In the above-described configuration, the ambient light from the light-collecting unit is guided to the object to be illuminated by the means for redirecting, and thereby many variations in relative positions of the light-collecting unit and the object to be illuminated are made possible. The means for redirecting is not limited to a means that redirects a light by reflection, but other variations, for example, such means that redirects a light by refraction, diffraction, and the like may be employed.

The above-described lighting device may be such a device in which the light-collecting unit comprises a flat outward surface on which the ambient light is incident and a serrated reflecting surface provided on a surface opposite to the outward surface.

By employing the above configuration, ambient light can be efficiently converted into a transmitting light.

The above-described lighting device may be such a device in which the means for redirecting a proceeding direction of light is a reflecting surface for reflecting the ambient light.

The present invention also provides a liquid crystal display device capable of utilizing ambient light for illuminating a liquid crystal panel provided in a casing, comprising:

a light-collecting unit for collecting the ambient light and converting at least part of the ambient light into a transmitting light transmitted in the light-collecting unit, and a light-guiding unit for guiding the transmitting light to the liquid crystal panel by redirecting a light path of the transmitting light.

By employing the above configuration, unlike conventional light-collecting units, two separate units each having a different function (i.e., a light-collecting unit for collecting and capturing ambient light, and a light-guiding unit, connected to the light-collecting unit, for guiding the light to a liquid crystal display panel) are provided in the device. Accordingly, an occupied area of the light-collecting unit is increased, and thereby an increased brightness is achieved.

A liquid crystal display device according to the invention may be such a device in which the light-collecting unit comprises a serrated reflecting surface provided on a surface of the light-collecting unit opposite to an outward surface of the light-collecting unit on which the ambient light is incident.

The serrated reflecting surface converts ambient light into a transmitting light to transmit the light to the light-guiding unit.

A liquid crystal display device according to the invention may be such a device in which the light-collecting unit is provided on an upper face of the casing of the liquid crystal display device.

By employing such a configuration, ambient light coming from an upward direction can be efficiently guided to the liquid crystal display panel.

A liquid crystal display device according to the invention may be such a device in which the light-collecting unit is provided on an upper face of the casing of the liquid crystal display device.

By employing such a configuration, ambient light coming from an upward direction and a sideward direction can be efficiently guided to the liquid crystal display panel.

A liquid crystal display device according to the invention may be such a device in which:

the light-collecting unit comprises a first light-collecting unit formed on a face of the casing opposite to a face on which the liquid crystal panel is provided, and a second light-collecting unit formed on an upper face of the casing, and one of the end faces of the second light-collecting unit is connected to one of the end faces of the first light-collecting unit, and the other end face of the second light-collecting unit is connected to one of the end faces of the light-guiding unit.

By providing the first light-collecting unit and the second light-collecting unit as described above, more ambient light can be collected, and a brightness of the liquid crystal panel is further increased.

A liquid crystal display device according to the invention may further comprise:

a flat reflecting surface formed at a connecting part of the first light-collecting unit and second light-collecting unit and placed in an inclined position so that a light from the first light-collecting unit is reflected and guided to the second light-collecting unit.

By employing such a configuration, a transmitting light captured in the first light-collecting unit can be efficiently transmitted to the light-guiding unit through the second light-collecting unit.

A liquid crystal display device according to the invention may be such a device in which:

the second light-collecting unit has a flat transparent outward surface and a flat reflecting surface opposed to the outward surface, the flat reflecting surface downwardly inclined towards the light-guiding unit, the first light-collecting unit has a flat transparent outward surface on which ambient light is incident and a first serrated reflecting surface comprising a plurality of first inclined surfaces and a second serrated reflecting surface comprising a plurality of second inclined surfaces, the first and second serrated surfaces both being formed on a surface opposite to the outward surface and the first serrated reflecting surface being disposed upward of the second serrated reflecting surface on the casing, the plurality of first inclined surfaces and the plurality of second inclined surfaces inclined in directions opposite to each other, and the plurality of first inclined surfaces and the flat reflecting surface in the second light-collecting unit are commonly inclined towards the light-guiding unit.

By employing such a configuration, ambient light incoming from a direction forward and obliquely upward can be efficiently captured and converted into a transmitting light by the second inclined surfaces, and the transmitting light can be transmitted to the second light-collecting unit.

A liquid crystal display device according to the invention may be such a device in which:

the serrated reflecting surface in the first light-collecting unit has a first serrated surface comprising a plurality of first inclined surfaces and second serrated reflecting surface comprising a plurality of second inclined surfaces, the plurality of first inclined surfaces and the plurality of second inclined surfaces inclined in directions opposite to each other, the first serrated reflecting surface being disposed upward of the second serrated reflecting surface on the casing, the serrated reflecting surface in the second light-collecting unit comprises a plurality of inclined surfaces, and the plurality of first inclined surfaces in the first light-collecting unit and the plurality of inclined surfaces in the second light-collecting unit are commonly inclined towards the light-guiding unit.

In the above-described configuration as well, ambient light incoming from a direction forward and obliquely upward can be efficiently captured and converted into a transmitting light by the second inclined surfaces, and the transmitting light can be transmitted to the second light-collecting unit.

A liquid crystal display device according to the invention may be such a device in which:

the second light-collecting unit has a flat transparent outward surface and a flat reflecting surface opposed to the outward surface, the flat reflecting surface downwardly inclined towards the light-guiding unit, and the first light-collecting unit has a flat transparent outward surface and a flat reflecting surface opposed to the outward surface, the flat reflecting surface inclined in such a manner that a thickness of the first light-collecting unit is gradually reduced towards a top of the casing.

In the above-described configuration, ambient light incoming from a direction forward and obliquely upward can be efficiently captured and converted into a transmitting light.

A liquid crystal display device according to the invention may be such a device in which:

the second light-collecting unit has a flat transparent outward surface and the serrated reflecting surface, and the first light-collecting unit has a flat transparent outward surface and a flat reflecting surface opposed to the outward surface, the flat reflecting surface inclined in such a manner that a thickness of the first light-collecting unit is gradually reduced towards a top of the casing.

In the above-described configuration as well, ambient light incoming from a direction forward and obliquely upward can be efficiently captured and converted into a transmitting light.

A liquid crystal display device according to the invention may be such a device in which the serrated reflecting surface comprises a plurality of inclined surfaces in which an inclined angle thereof is varied.

In such a configuration, by making small the inclined angle of the inclined surfaces, more transmitting light can be produced and efficiently transmitted to the light-guiding unit.

A liquid crystal display device according to the invention may be such a device in which the inclined angle is in the range of 5° to 50°.

The inclined angle is restricted since if the angle is out of the foregoing range, the efficiency of converting ambient light into a transmitting light is considerably deteriorated.

A liquid crystal display device according to the invention may be such a device in which the serrated reflecting surface has a shape such that when viewed from the top, a plurality of stripe-like lines are formed.

Further, each of the plurality of stripe-like lines may form a V-like shape whose inferior angle is faced to the light-guiding unit.

By employing such a configuration, ambient light can be focused in a direction of the center of the light-collecting unit. Therefore, a light escaping outside from an end face of the light-collecting unit is reduced and the efficiency of capturing light is increased, and consequently the efficiency of light utilization is improved.

A liquid crystal display device according to the invention may be such a device in which the light-guiding unit guides the transmitting light from the light-collecting unit to a back of the liquid crystal panel so as to illuminate the liquid crystal from the back of the liquid crystal panel.

By employing this configuration, the liquid crystal display device can employ a transmissive-type liquid crystal panel.

In the above-described liquid crystal display device, the light-guiding unit may have a flat reflecting surface formed on an outward surface thereof and a prism array formed on a surface opposite to the outward surface, and the light-guiding unit may direct the transmitting light from the light-collecting unit towards the back of the liquid crystal panel.

In the above-described configuration, ambient light is guided from the prism array towards the back of the liquid crystal panel, and thereby the light can be efficiently guided to the back of the liquid crystal display panel.

The above-described liquid crystal display device may further comprise a flat inclined reflecting surface formed in an area from the outward surface to an end face thereof adjacent to the liquid crystal panel.

As in the above-described configuration, when the light-guiding unit has a flat inclined reflecting surface in an area from the outward surface to an end face thereof adjacent to the liquid crystal panel, a light path of the transmitting light can be changed thereby, and the transmitting light can be efficiently guided to the back of the liquid crystal panel.

A liquid crystal display device according to the invention may be such a device in which:

the light-guiding unit comprises a light guiding plate disposed in front of the liquid crystal panel so that the transmitting light from the light-collecting unit is guided to the light guiding plate and emitted to the liquid crystal panel to illuminate the liquid crystal panel.

By employing this configuration, the liquid crystal display device can employ a reflective-type liquid crystal panel.

A liquid crystal display device according to the invention may be such a device in which at least a portion of the light-collecting unit is movable.

By employing such a configuration, the light-collecting unit can be set at a most suitable position so that ambient light is more efficiently collected.

A liquid crystal display device according to the invention may be such a device in which at least a surface of the light-collecting unit is composed of a semi-transparent material.

Further, a liquid crystal display device according to the invention may be such a device in which at least a portion of a surface of the light-collecting unit is composed of a colored semi-transparent material.

Even when a surface of the light-collecting unit is composed of a semi-transparent or colored semi-transparent material, the advantageous effect of collecting ambient light can be sufficiently attained.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
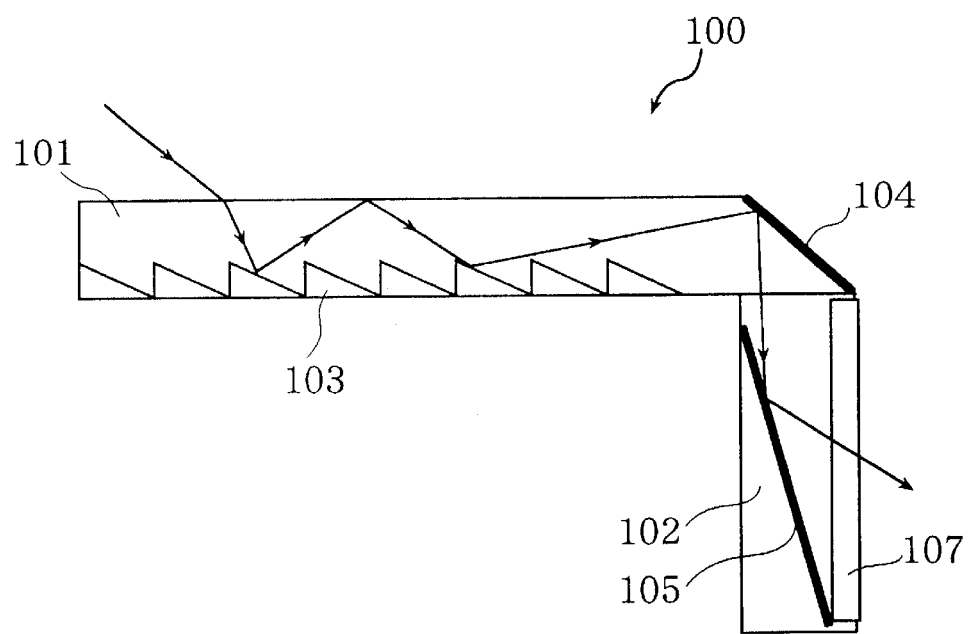
FIG. 1 is a cross sectional view of a lighting device in accordance with Example 1 of the present invention.

DESCRIPTION OF THE PREFERRED EMBODIMENTS.

Now, referring to the drawings, preferred embodiments of the present invention are detailed below.

EXAMPLE 1

FIG. 1 shows a configuration of a lighting device in accordance with Example 1 of the present invention. A lighting device 100 has a light-collecting unit 101 for collecting ambient light, and a light-guiding unit 102 disposed perpendicular to the light-collecting unit 101. The light-collecting unit 101 is composed of, for example, an acrylic plate, and has a serrated reflecting surface 103 formed on a lower surface thereof. At the connecting part between the light-collecting unit 101 and the light-guiding unit 102, a flat reflecting surface 104 is inclinedly formed so that the incident light thereon can be redirected. In the light-guiding unit 102, a flat reflecting surface 105 is inclinedly formed opposed to an object to be illuminated 107 so that the incident light thereon can be redirected.

Ambient light entering the light-collecting unit 101 from the upper surface thereof is reflected at the serrated reflecting surface 103 and captured in the light-collecting unit 101, and thus converted into a transmitting light 111 which is transmitted within the light-collecting unit 101. The transmitting light 111 is reflected at the reflecting surface 104 and then at the reflecting surface 105 so as to illuminate the object to be illuminated 107.

By employing such a configuration, nearly all the ambient light entering the light-collecting unit 101 from the upper surface thereof is guided to the object to be illuminated, and thereby a high brightness is achieved. In particular, when a light-collecting unit is transparent, ambient light can be efficiently converted into a transmitting light by utilizing total internal reflection at an outward interface of the light-collecting unit 101.

Although this example describes a configuration in which the light-collecting unit 101 is disposed approximately perpendicular to the light-guiding unit 102, the angle of the light-collecting unit 101 and the light-guiding unit 102 may be variable. When the light-collecting unit 101 is formed to be movable so that it can have a variable angle according to an incident orientation of ambient light, further higher brightness can be achieved. In addition, when a transparent material is used for the light-collecting unit, high light collecting efficiency is obtained. However, even when a semi-transparent material is employed for the light-collecting unit based on a consideration of appearance of the device and the like, an advantage of collecting ambient light can be attained. Also, a colored material as well can attain the advantage of collecting ambient light.

EXAMPLE 2

Figure 2:
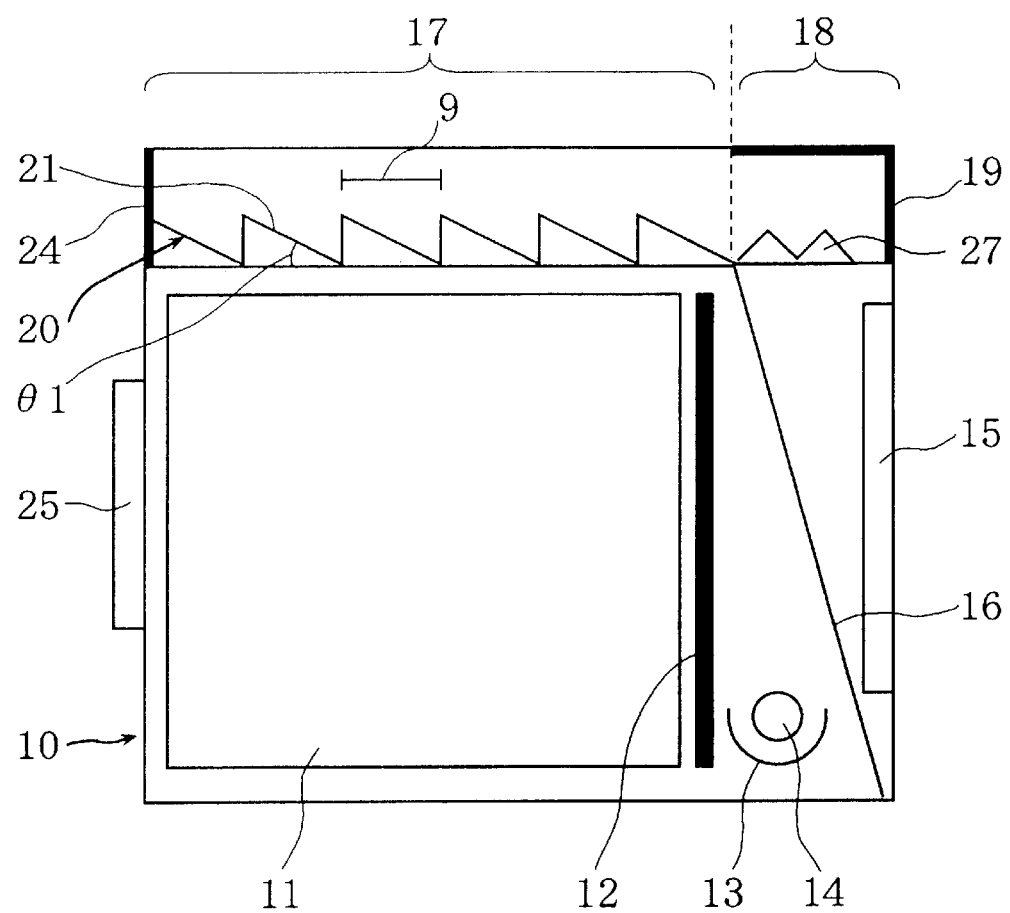
FIG. 2 is a cross sectional view of a liquid crystal display device in accordance with Example 2 of the present invention.

FIG. 2 shows a cross sectional view of a liquid crystal display device in accordance with Example 2 of the present invention.

The liquid crystal display device of Example 2 is provided in a digital camera, and has a liquid crystal display panel 15 on one end face of a casing 10, and a lens unit 25 on another end face of the casing 10. On an upper face of the casing 10, there are provided a light-collecting unit 17 and a light-guiding unit 18 connected to the light-collecting unit 17. The light-collecting unit 17 has a function of collecting ambient light as well as a function of converting the collected ambient light into a transmitting light which is captured and transmitted within the light-collecting unit. The light-guiding unit 18 has a function of guiding the transmitting light from the light-collecting unit 17 to the back of the liquid crystal panel 15 by redirecting a light path of the transmitting light.

The light-collecting unit 17 is so formed that an outward surface facing ambient light is a flat surface, and the other surface opposing the outward surface is a serrated reflecting surface 20. The light-guiding unit 18 has a reflecting surface 19 extending from an outward surface of the light-guiding unit 18 to an end face of the liquid crystal display device, and also has a transparent prism array 27 provided on a surface opposed to the outward surface of the light-guiding unit 18. At the back of the liquid crystal panel 15, there are provided a semi-transparent mirror 16, a diffuser 12, a backlight 14, a backlight cover 13, and so forth. In FIG. 2, the reference numeral 11 denotes a driving circuit section.

Figure 3:
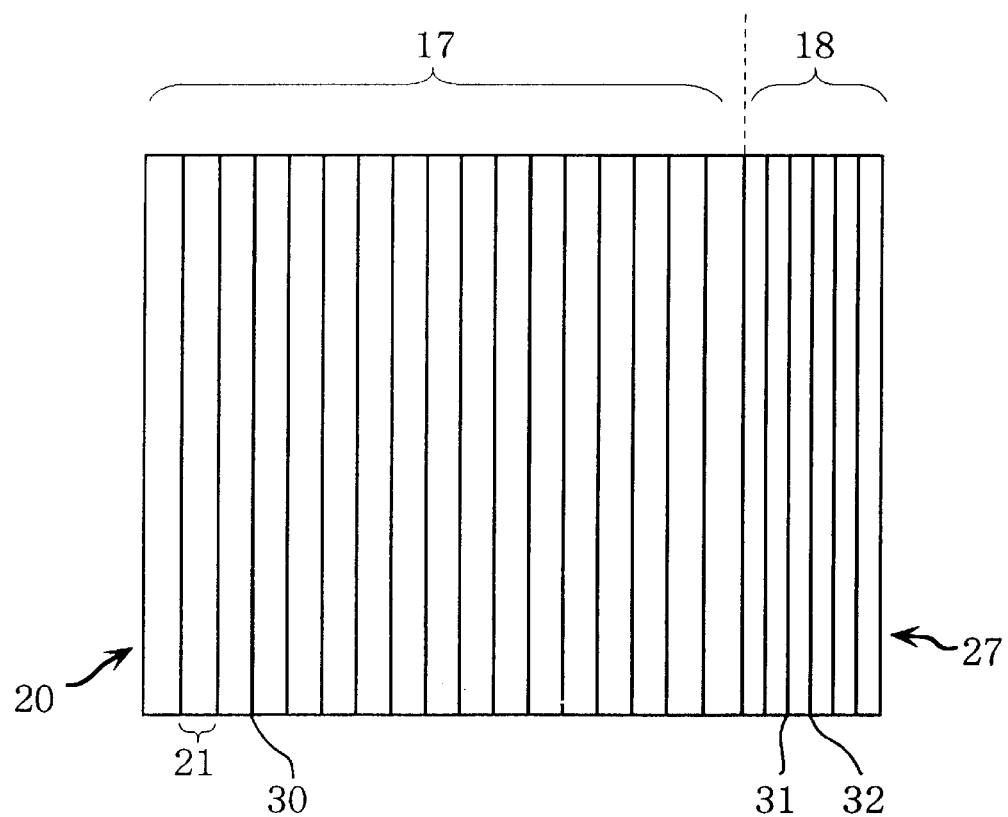
FIG. 3 is a plan view showing a light-collecting unit 17 and a light-guiding unit 18 in a liquid crystal display device in accordance with Example 2.

The serrated reflecting surface 20 of the light-collecting unit 17 is so formed that when viewed from the top, it has a plurality of stripe-like lines, as shown in FIG. 3. The serrated reflecting surface 20 has a plurality of inclined surfaces 21, and each of the inclined surfaces 21 is so formed to have a downward slope towards the light-guiding unit 18. It is noted that in FIG. 2, the reflecting surface formed on an upper surface of the light-guiding unit 18 is shown, but in FIG. 3, the reflecting surface is not shown for the sake of brevity. In FIG. 3, the reference numeral 30 designates a top edge line of the serrated reflecting surface 20, the reference numeral 31 designates an uppermost part of the prism array 27, and the reference numeral 32 designates a lowermost part of the prism array 27. By forming the serrated reflecting surface 20 so as to have a plurality of stripe-like lines as described above, the plurality of inclined reflecting surfaces can be densely formed and thereby the efficiency of light utilization can be increased.

Figure 4:
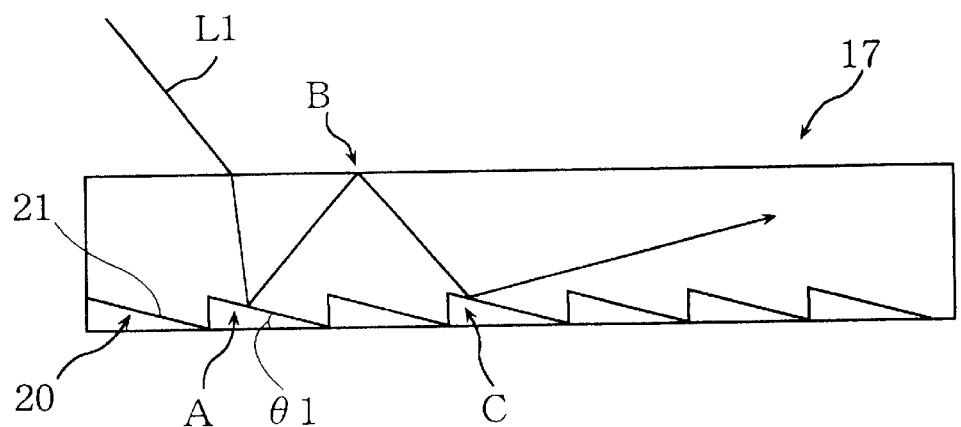
FIG. 4 illustrates a locus of a light in the light-collecting unit 17 having a serrated reflecting surface 20.

FIG. 4 shows a locus of an incident light L1 in the case where the serrated reflecting surface is used. The incident light L1 reaching the serrated reflecting surface 20 having a tilt angle $\theta 1$ repeats reflections, such as a reflection A at an inclined surface 21, then a total internal reflection B at the upper surface, then a reflection C at another inclined surface 21, and so forth, and transmits within the light-collecting unit 17. Here, by the effect of the tilt angle $\theta 1$, a reflection angle of the incident light L1 becomes larger than a total internal reflection angle, and the light is thereby captured and converted to be a transmitting light. In addition, each time the reflection is repeated at the serrated reflecting surface 20, the reflection angle is increased. As a result, it is made possible for the reflected light to be transmitted a long distance with only one reflection, and the number of times of reflection is thus reduced, which prevents attenuation of intensity of the light.

The light captured and transmitted in the light-collecting unit 17 enters the light-guiding unit 18. Then, the light comes out of the prism array 27. Part of the light is reflected by the semi-transparent mirror 16 and then illuminates the liquid crystal panel 15, and the rest of the light is diffused by the diffuser 12 and then emitted from the liquid crystal panel 15. By providing a first reflecting surface 19 and a second reflecting surface 24, the effect of capturing ambient light is increased and the brightness is also increased.

In conventional devices, the light-collecting unit has approximately the same size as that of the light-guiding unit 18. By contrast, in the liquid crystal display device according to the invention, the light-collecting unit 17 is provided separately from the light-guiding unit 18, and thereby an occupied area of the light-collecting unit 17 can be increased, achieving an advantageous effect of remarkably improving a panel brightness.

It is to be noted that in Example 2 herein, since the backlight 14 is disposed directly under the prism array 27, when the backlight 14 is operated, part of the light from the backlight 14 passes through the prism array 27, reflects at the first reflecting surface 19 and the second reflecting surface 24, and comes back to the back of the liquid crystal display panel 15. Therefore, in comparison with, for example, a case in which a backlight is disposed behind a diffuser, this example remarkably increases the efficiency of light utilization of the light from the backlight.

Now, a producing method of the liquid crystal display device described above is detailed below. A first acrylic plate was stacked on an upper face of a casing 10 of a digital camera, and then a second acrylic plate composing the light-collecting unit 17 and the light-guiding unit 18 was stacked on the first acrylic plate. A light-collecting unit 17 was prepared in the following manner. An acrylic plate having a thickness of 3 mm was used for the second acrylic plate. With the use of a diamond cutter, a portion of the back surface of the acrylic plate which corresponds to the serrated reflecting surface of the light-collecting unit 17 was formed in a serrated shape, and a portion of the back surface of the acrylic plate which corresponds to a surface of the light-guiding unit 18 was formed in a shape of a prism array. The surface of the acrylic plate was so formed that both portions have stripe-like lines as shown in FIG. 3. Thereafter, on the back surface of the light-collecting unit 17, aluminum was deposited to form the serrated reflecting surface 20. The tilt angle θ1 of the serrated reflecting surface 20 was 20°, and the pitch 9 of the serrated reflecting surface 20 was 3 mm. A refracting angle of the prism array was 90°. Then, a reflecting surface 24 was formed on one end face of the light-collecting unit 17, and a reflecting surface 19 was formed on a portion of the upper face and on one end face of the light-guiding unit 18. Thereafter, a semi-transparent mirror 16 was provided at the back of the liquid crystal panel 15. A transmissivity of the semi-transparent mirror 16 was 70%, and the reflectivity was 30%.

The digital camera thus produced was observed under ambient light. As a result, the liquid crystal panel 15 showed a remarkably high brightness since the light-collecting unit 17 had a large size. Even without using the backlight 14, a sufficient brightness for viewing was obtained.

Figure 5:
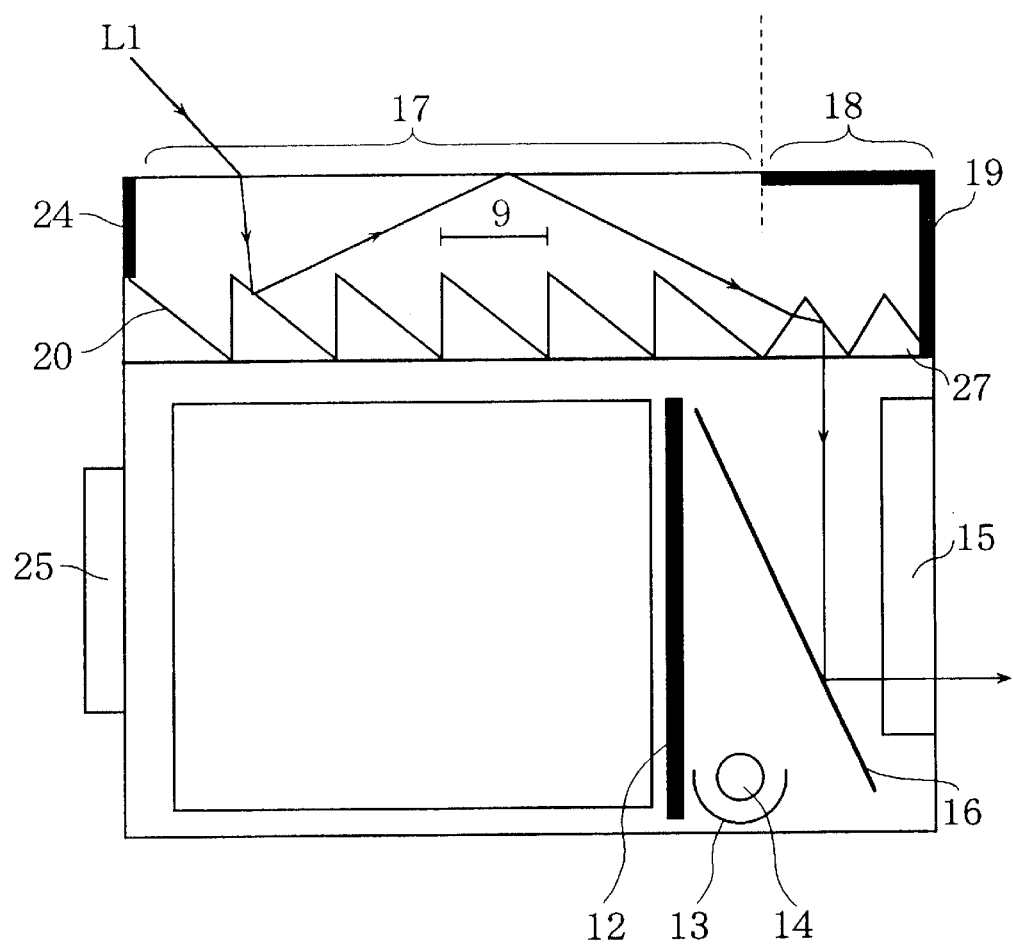
FIG. 5 illustrates a locus of a light which enters from the light-collecting unit 17 and reaches a liquid crystal display panel 15.
Figure 6:
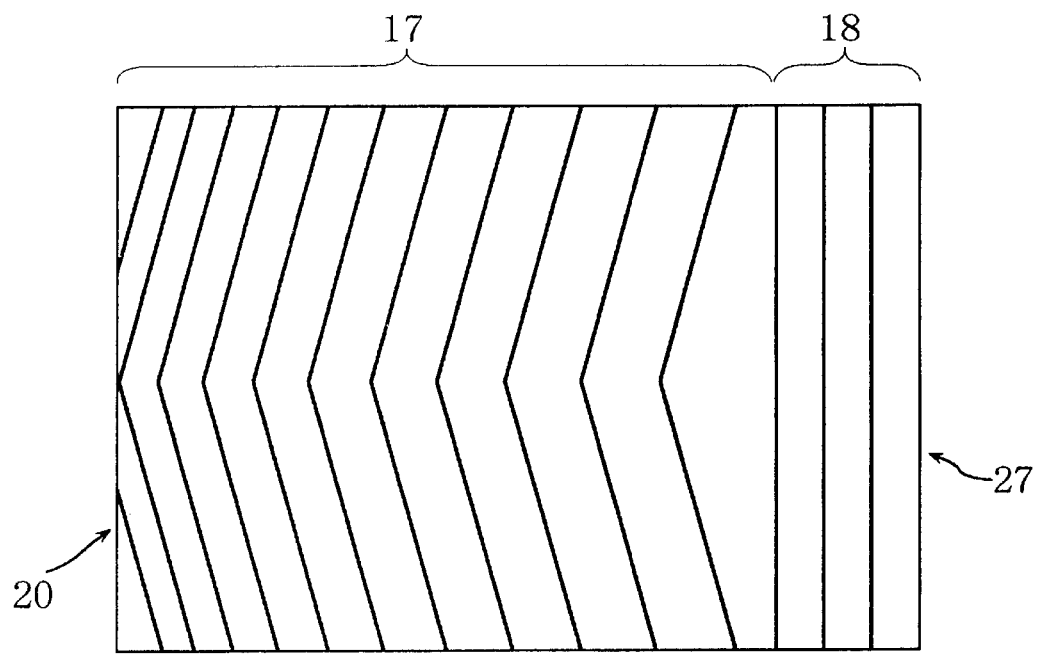
FIG. 6 shows a variation of the serrated reflecting surface 20.

FIG. 5 shows an example of a locus of the light entering the light-collecting unit of the liquid crystal display device according to the invention. An incident light L1 is reflected at the serrated reflecting surface 20, then reflected at the upper surface by total internal reflection, then guided through the prism array 27 and the semi-transparent mirror 16, and finally emitted from the liquid crystal panel 15. The number of times of the reflection at the serrated reflecting surface 20 and the number of times of the total internal reflection at the upper surface are determined by a size of the pitch 9 and a length of the light-collecting unit 17.

The tilt angle θ1 and the pitch 9 of the inclined surfaces 21 are not limited to the above example. When the tilt angle θ1 is in the range of 10° to 50°, substantially the same effect can be obtained. If the tilt angle θ1 is greater than 50°, diffused light is generated at the edge of the reflecting surface and captured light is reduced, thereby degrading the efficiency of light utilization. On the other hand, if the tilt angle θ1 is less than 10°, a light incoming from a direction approximately forward of the device cannot be captured, and the light escapes from the upper surface, which also degrades the efficiency of light utilization.

Considering that a normal range of incident angle of ambient light is from 20° to 40°, the tilt angle θ1 is preferable to be in the range of 15° to 30°. The pitch 9 may be equal to or less than 1 mm. However, if the pitch 9 is as small as a level of wavelength, diffracted light is caused, which reduces the efficiency of light utilization and colors the light-collecting unit into a rainbow color. In this case, in order to prevent the diffraction, the pitch 9 must be varied. It is also possible to form the pitch 9 in such a manner that it becomes larger as it becomes away from the light-guiding unit 18, and/or that the edge lines of the serrated surface are bent as will be described in Example 3 below.

Figure 7:
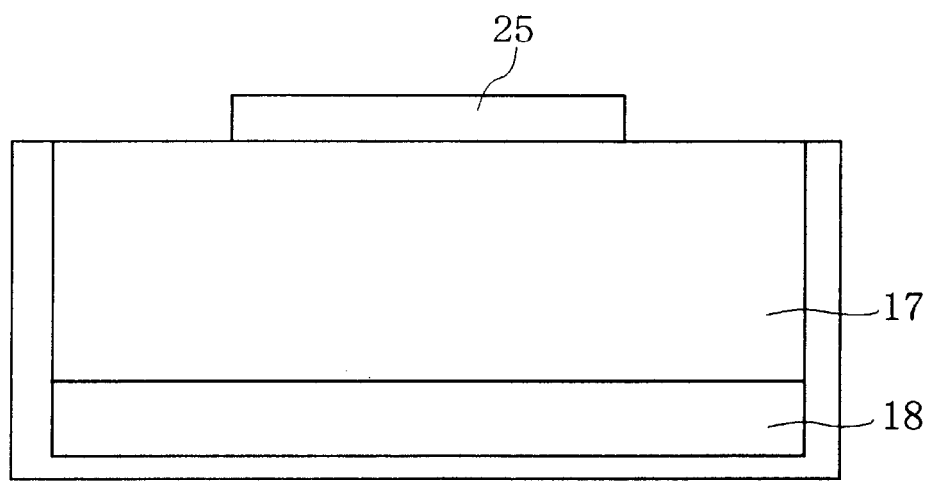
FIG. 7 is a top plan view of a liquid crystal display device in accordance with Example 2 of the present invention.
Figure 8:
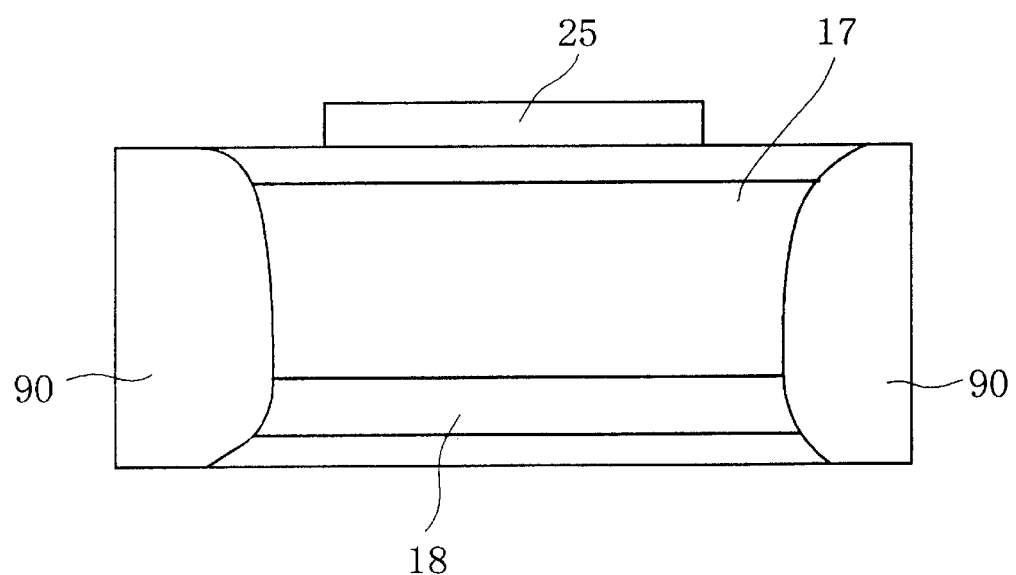
FIG. 8 shows a variation of a liquid crystal display device in accordance with Example 2, in which handles 90 are provided.

The thickness of the light-collecting unit 17 and the thickness of the light-guiding unit 18 are not limited to the example described above. The thicknesses may be determined based on considerations of both a size of the pitch 9 and a height of the step of the inclined surfaces 21. In addition, the light-collecting unit 17 and the light-guiding unit 18 may be formed of materials other than an acrylic plate. For the serrated reflecting surface 20, instead of aluminum, other metals having a high reflectivity such as Ag and the like may be deposited. The light-collecting unit 17 is not necessarily provided over the entire upper face of the casing. An area of the formed light-collecting unit 17 may be varied based on a consideration of a panel brightness. For example, as shown in FIG. 7, the area may be 60% of the area of the upper face. When the area of the light-collecting unit is equal to or greater than 20% of the area of the upper face, the advantageous effect of increasing a panel brightness can be attained. In addition, as shown in FIG. 8, in order to increase the handleability of the digital camera, a handle 90 for holding the camera may be provided.

The handle 90 may be provided on the upper surface of the light-collecting unit. The light-collecting unit may be provided so as to avoid the area of the handle 90. Although a semi-transparent mirror is employed in the example described here, it may be eliminated. When a semi-transparent mirror is employed, a panel brightness is increased in the case of not using the backlight. If a semi-transparent mirror is not employed, a panel brightness is increased in the case of using the backlight.

In the example described above, the light-collecting unit 17 and the light-guiding unit 18 are fixed on the upper face of the liquid crystal display device, but they may be made movable. This is achieved by, for example, configuring the device so that an axis of rotation is made to be a contact line of the upper face of the device and the face on which the liquid crystal panel is provided, and the light-collecting unit 17 and the light-guiding unit 18 can be rotated around the axis of rotation. Thereby, the light-collecting unit can be set at a suitable position according to the incident angle of ambient light. In addition, when a transparent material is used for the light-collecting unit, high light collecting efficiency is obtained. However, even when a semi-transparent material is employed for the light-collecting unit based on a consideration of appearance of the device and the like, an advantage of collecting ambient light can be attained. Also, a colored material as well can attain the advantage of collecting ambient light.

In the above example, although the liquid crystal display device is provided in a digital camera, the invention is not limited thereto. The device of the invention may suitably be used for any apparatus that can be used under ambient light. Examples for such apparatus include camcorders, handheld computers, transflective-type personal digital assistants, and the like.

EXAMPLE 3

Figure 9:
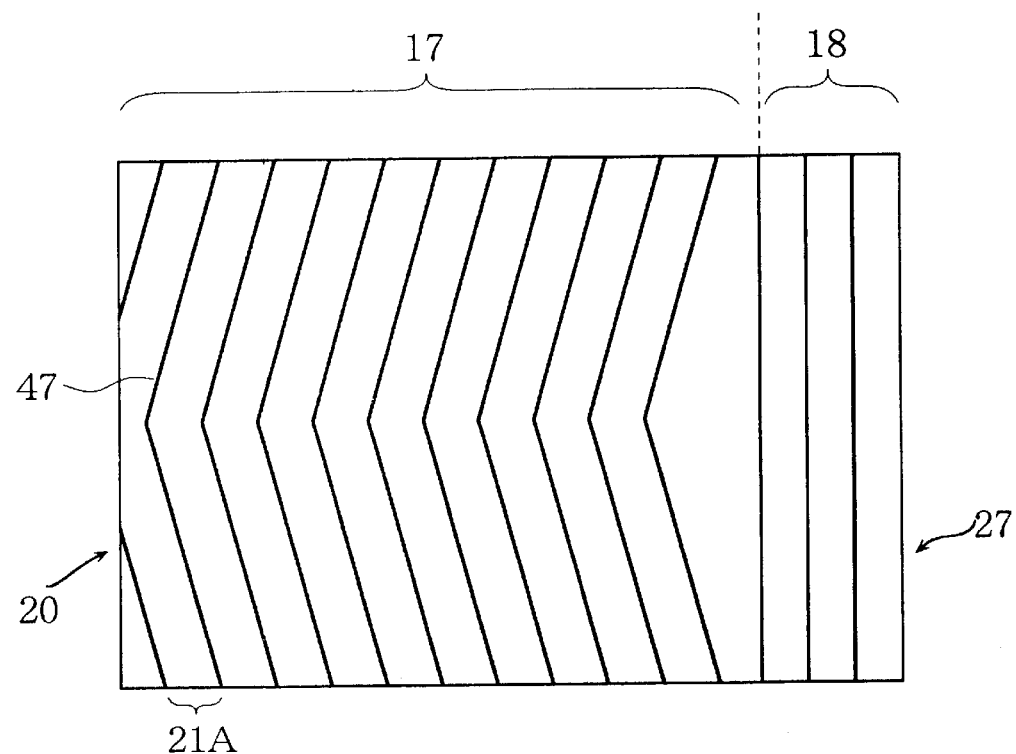
FIG. 9 is a plan view showing a light-collecting unit 17 and a light-guiding unit 18 in a liquid crystal display device in accordance with Example 3.

FIG. 9 shows a top plan view of a liquid crystal display device in accordance with Example 3. The liquid crystal display device in accordance with Example 3 has a similar configuration to that of Example 2, and like reference numerals refer to like parts in the drawing. Example 3 is characterized in that a plurality of inclined surfaces 21A in the light-collecting unit 17 are formed so that the top edge line of each inclined surface forms a V-like shape having an inflection part 47, and an inferior angle of the inflection part in the V-like shape is faced to the light-guiding unit 18. By forming the inclined surfaces to have a V-like shape, a light which enters the light-collecting unit 17 particularly from an obliquely upward direction can be focused on the light-guiding unit 18, and thereby the efficiency of light utilization is increased.

Now, a producing method of the liquid crystal display device described above is detailed below. The liquid crystal display device of Example 3 was produced in the same manner as that of Example 2 except that the serrated reflecting surface 20 was formed so that the inclined surfaces have stripe-like top edge lines each having an inflection part 47. The angle of each inflection part 47 was 160°. As a result of providing the inflection part 47 in the serrated reflecting surface 20, incoming ambient light was focused into a central direction of the light-guiding unit 18, increasing a light transmitting through the prism array 27 and hence increasing a panel brightness. The angle of the inflection part 47 may be other angles than the angle described above, and may be determined based of a consideration of a degree of light focusing. Specifically, based on the consideration, it is preferable that the angle be in the range of 30° to 170°. If the angle is less than 30°, the degree of light focusing is high and light is focused within a short transmission distance, and therefore, in the case of the light-collecting unit 17 being wide, the reflection at the end faces increases, which is not desirable. If the angle of the inflection part 47 is greater than 170°, the effect of light focusing is too small. It is noted that the angle of the inflection parts 47 may be varied in the serrated reflecting surface. In this case, the captured light can be focused more effectively into the light-guiding unit 18 when the serrated reflecting surface is so formed that the closer to the light-guiding unit 18 the inflection points 47 are, the larger the angles of the inflection parts 47.

EXAMPLE 4

Figure 10:
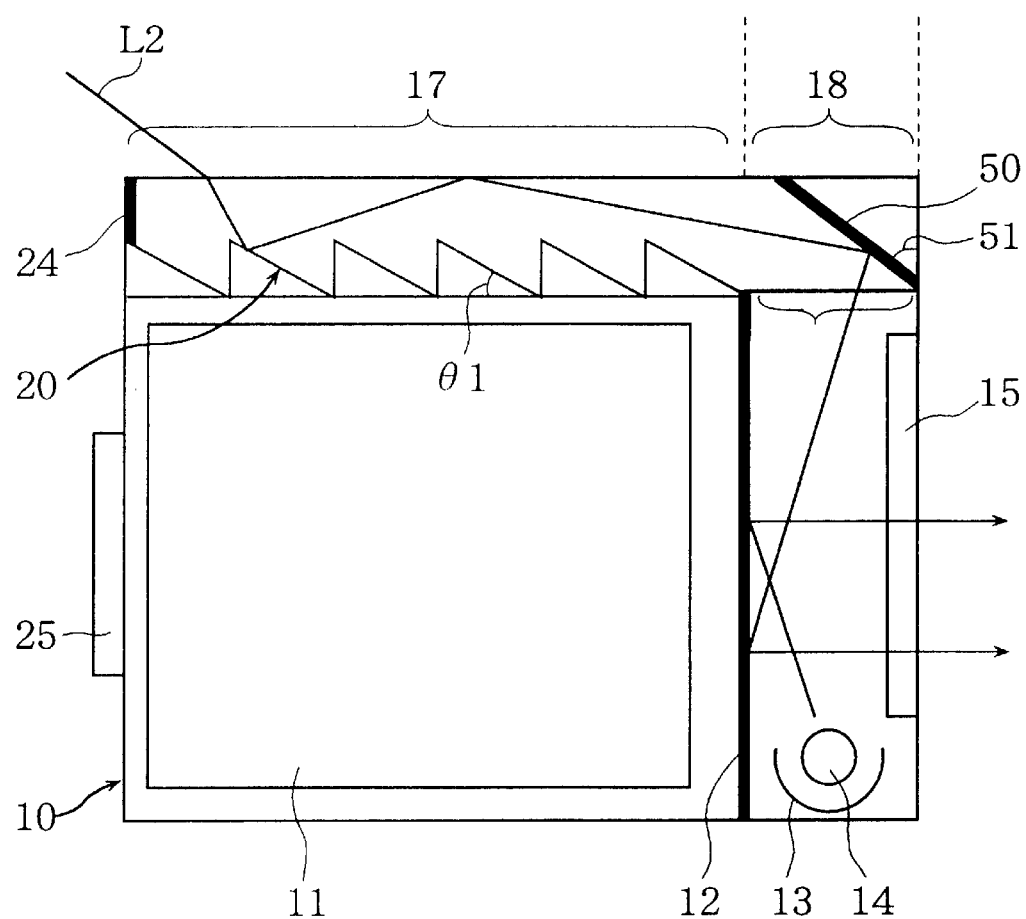
FIG. 10 is a cross sectional view showing a liquid crystal display device in accordance with Example 4 of the present invention.

FIG. 10 shows a cross sectional view of a liquid crystal display device in accordance with Example 4. The liquid crystal display device of Example 4 has a similar configuration to that of Example 2, and like reference numerals refer to like parts in the drawing. Example 4 is characterized in that an inclined reflecting surface 50 is provided in the light-guiding unit 18. By providing the inclined reflecting surface 50, a transmitting light captured in the light-collecting unit 17 can be directly reflected at the diffuser 12, and thereby the prism array 27 shown in FIG. 2 can be eliminated.

Now, a producing method of the liquid crystal display device described above is detailed below. The liquid crystal display device of Example 4 was produced in the same manner as that of Example 2 except that the inclined reflecting surface 50 was provided in the light-guiding unit 18. The inclined reflecting surface 50 is produced by firstly cutting off a corner of the light-guiding unit 18 and then depositing aluminum thereon. An inclined angle 51 of the reflecting surface 50 was 60°. The lower surface of the light-guiding unit 18 was a transparent flat surface. Since the reflecting surface 50 was employed, an incident light L2 was reflected at the diffuser 12, and an advantageous effect of increasing a panel brightness was attained. Providing the reflecting surface 50 also made the device configuration simpler than the configuration in which the prism array 27 and so forth are employed.

The inclined angle 51 may be other angles than described above, and the range of 10° to 70° is preferable. The incline angle 51 may be determined based on a consideration of a distribution of intensity of the light incident on the diffuser 12. If the inclined angle is small, an intensity of the light incident on an upper region of the diffuser 12 is increased, whereas if the inclined angle is large, an intensity of the light incident on a lower region of the diffuser 12 is increased.

Adjustment of the inclined angle 51 is also effective when the backlight 14 is used. An intensity of the light emitted from the backlight 14 and directly incident on the diffuser 12 is attenuated as the light goes from the lower region towards the upper region. Also, the light emitted from the backlight 14 and reflected at the diffuser 12 is retroreflected by the inclined reflecting surface 50. An intensity distribution of the retroreflected light is controlled by the inclined angle 51. Thus, by adjusting the inclined angle 51, it is made possible to add up the intensity distributions of the light directly incident on the diffuser 12 and the retroreflected light and thereby achieve a uniform intensity distribution of the light emitted from the diffuser 12 to the liquid crystal panel 15.

EXAMPLE 5

Figure 11:
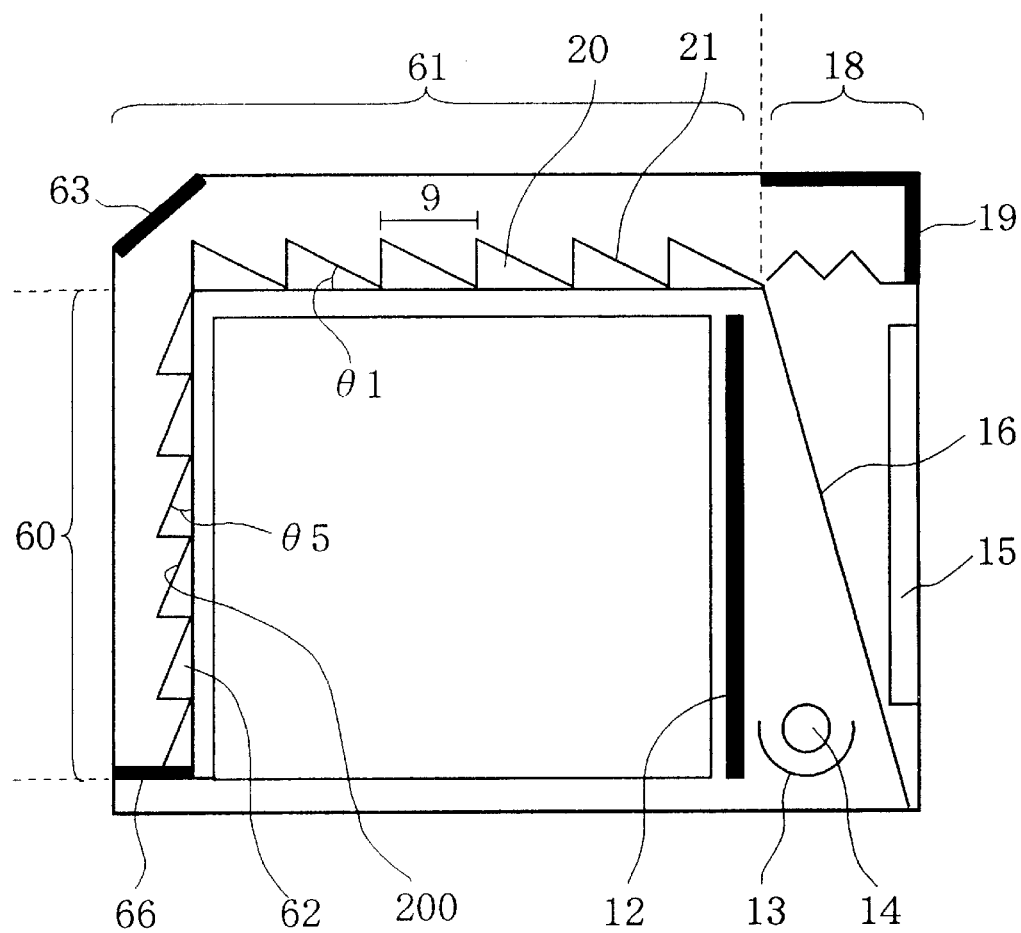
FIG. 11 is a cross sectional view showing a liquid crystal display device in accordance with Example 5 of the present invention.

FIG. 11 shows a cross sectional view of a liquid crystal display device in accordance with Example 5. The liquid crystal display device of Example 5 has a similar configuration to that of Example 2, and like reference numerals refer to like parts in the drawings. Example 5 is characterized in that while the liquid crystal display device of Example 2 has only one light-collecting unit, the liquid crystal display device of Example 5 has two light-collecting units, namely, a first light-collecting unit 60 and a second light-collecting unit 61. The second light-collecting unit 61 corresponds to the light-collecting unit 17 in Example 2, and has the same configuration as that of the light-collecting unit 17. The first light-collecting unit 60 is formed on a face of the casing 10 which is opposed to a face on which the liquid crystal panel 15 is provided, so as to avoid the area in which the lens unit 25 (for the sake of brevity, not shown in FIG. 11) is provided. The first light-collecting unit 60 has a serrated reflecting surface 62 with a plurality of inclined surfaces 200 such that the inclined surfaces 200 are inclined in an upward direction of the casing 10. At the connecting part of the first light-collecting unit 60 and the second light-collecting unit 61, an inclined reflecting surface 63 is provided. On a lower end face of the first light-collecting unit 60, a reflecting surface 66 is formed.

In the device having such a configuration, a light incoming from a direction forward and obliquely downward of the device is transmitted within the first light-collecting unit 60, reflected at the inclined reflecting surface 63, transmitted through the second light-collecting unit 61 and the light-guiding unit 18, and emitted from the liquid crystal panel 15. Accordingly, in comparison with the device of Example 2, the light-collecting unit of Example 5 has a larger area for collecting light, thereby achieving an increased panel brightness. Furthermore, the inclined surfaces 200 in the serrated reflecting surface 62 and the inclined surfaces 21 in the serrated reflecting surface 20 are commonly inclined towards the light guiding unit 18, and therefore the efficiency of light transmission is increased.

Now, a producing method of the liquid crystal display device described above is detailed below. The liquid crystal display device of Example 5 was produced in the same manner as that of Example 2 except the following. The first light-collecting unit 60 was provided on a face of the casing 10 which is opposed to the face on which the liquid crystal panel 15 is provided. The second light-collecting unit 61, which corresponds to the light-collecting unit 18 in Example 2, was prepared in the same manner as in Example 2. The first light-collecting unit 60 was formed so as to avoid the area in which the lens unit 25 (not shown) was provided. On the back surface of the first light-collecting unit 60, the serrated reflecting surface 62 was formed so that each of the inclined surfaces 200 has a tilt angle θ5. The tile angle θ5 was 25°. In the second light-collecting unit 61, the serrated reflecting surface 20 was formed so as to have a tilt angle of θ1. The tile angle θ1 was 15°. Since the tilt angle θ5 was made 25°, a light incoming from a direction forward and obliquely downward into the first light-collecting unit 60 was captured and converted into a transmitting light in the first light-collecting unit 60. The captured light was reflected by the inclined reflecting surface 63 and guided to the second light-collecting unit 61 and further to the light-guiding unit 18. As a result of these, a panel brightness was increased. As described above, by employing the first light-collecting unit 60, an area of the light-collecting unit was enlarged, and consequently the transmitting light was increased, resulting in a remarkable increase in a panel brightness.

The tilt angles θ1 and θ5 are not limited to the angles mentioned above, but may be designed according to an incident direction of the light mainly incoming into the device. The shape of the top edge lines in the serrated reflecting surface when viewed in a plan view may be either a linear stripe-like shape or a stripe-like shape with an inflection part. When the first light-collecting unit 60 has top edge lines having a linear stripe-like shape and the second light-collecting unit 61 has top edge lines having a stripe-like shape with an inflection part, the efficiency of light utilization is high. This is due to the fact that since the physical distance between the first light-collecting unit 60 and the light-guiding unit 18 is large, focusing of the light causes an increase in a light directed to the end faces, which induces a degradation in the efficiency of light utilization.

In the above-described example, the first light-collecting unit 60 is formed on a face opposed to the liquid crystal panel 15, but it may be formed on a side face of the casing 10. In this case, the first light-collecting unit 60 may be formed on one of the side faces, or on both side faces. In particular, when the first light-collecting unit 60 is formed on only a leftward face with respect to the liquid crystal panel 15, an increase in brightness can be achieved without reducing handleability of the digital camera. This is because digital cameras are normally designed for right handed users, and a grip is often formed on the right hand face. It is also noted that the first light-collecting unit 60 may be provided not necessarily over the entire front face of the casing.

EXAMPLE 6

Figure 12:
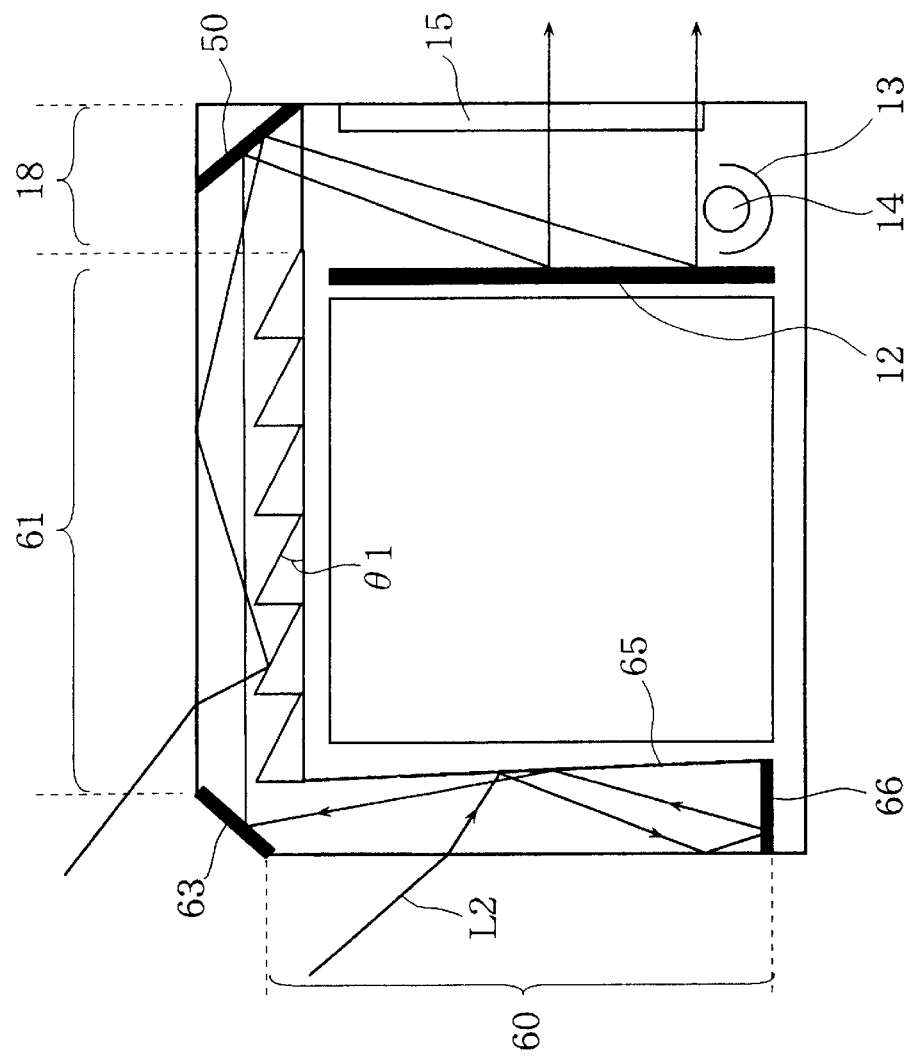
FIG. 12 is a cross sectional view showing a liquid crystal display device in accordance with Example 6 of the present invention.

FIG. 12 shows a cross sectional view of a liquid crystal display device in accordance with Example 6. The liquid crystal display device of Example 6 has a similar configuration to that of Example 5, and like reference numerals refer to like parts in the drawing. Example 6 is characterized in that an inclined reflecting surface 65 is provided in place of the serrated reflecting surface 62 in Example 5. A direction of inclination of the inclined reflecting surface 65 is such that a thickness of the first light-collecting unit 60 is continuously decreased towards the upper part of the device. By providing the inclined reflecting surface 65, an incident light L2 incoming from a direction forward and obliquely upward of the device is captured and transmitted in the first light-collecting unit 60 since a reflection angle of the incident light L2 becomes greater than a total internal reflection angle. Hence, a panel brightness is increased.

Now, a producing method of the liquid crystal display device described above is detailed below. The liquid crystal display device of. Example 6 is produced in the same manner as that of Example 5 except the following. The back surface of the first light-collecting unit 60 is formed to be the inclined reflecting surface 65. Inclination of the inclined reflecting surface 65 is such that a thickness of the first light-collecting unit 60 is continuously decreased towards the upper part of the device, and thereby the incident light L2 incoming from a direction forward and obliquely upward of the device can be captured. When the inclined reflecting surface 65 is employed, production of the device is made easier, although the thickness of the layer in which light is transmitted is increased. It is preferable that an inclination angle of the inclined reflecting surface 65 is in the range of 10° to 30°.

EXAMPLE 7

Figure 13:
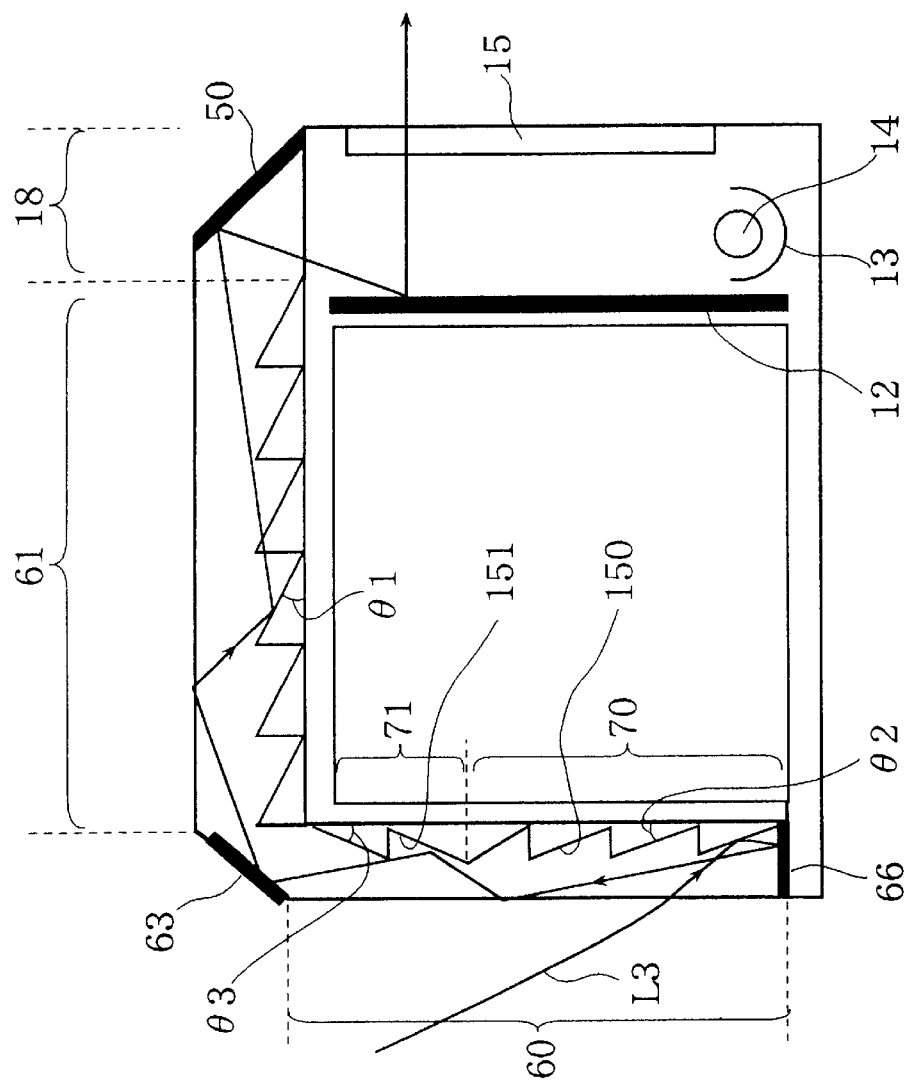
FIG. 13 is a cross sectional view showing a liquid crystal display device in accordance with Example 7 of the present invention.

FIG. 13 shows a cross sectional view of a liquid crystal display device in accordance with Example 7. The liquid crystal display device of Example 7 has a similar configuration to that of Example 5, and like reference numerals refer to like parts in the drawing. Example 7 is characterized in that the back surface of the first light-collecting unit 60 is composed of a first serrated reflecting surface 71 comprising a plurality of first inclined surfaces 151 each having a tilt angle θ3, and a second serrated reflecting surface 70 comprising a plurality of second inclined surfaces 150 each having a tilt angle θ2. The first inclined surfaces 151 in the first serrated reflecting surface 71 and the second inclined surfaces 150 in the second serrated reflecting surface 70 are inclinedly formed in directions opposite to each other. The inclined surfaces 151 in the first serrated reflecting surface 71 and the inclined surfaces 21 in the serrated reflecting surface 20 are commonly inclined towards the light guiding unit 18.

By forming the second inclined surfaces 150 in the second serrated reflecting surface 70 so that the second inclined surfaces 150 are inclined downwardly, an incident light L3 is at first converted into a captured light proceeding downward, and is reflected by the reflecting surface 75 provided at a lower part of the device to be converted into a captured light transmitting upward. The first serrated reflecting surface 71 has a function of effectively capturing a light which transmits upward.

Now, a producing method of the liquid crystal display device described above is detailed below. The liquid crystal display device of Example 7 is produced in the same manner as that of Example 5 except that the back surface of the first light-collecting unit 60 is composed of a first serrated reflecting surface 71 comprising a plurality of first inclined surfaces 151 each having a tilt angle θ3, and a second serrated reflecting surface 70 comprising a plurality of second inclined surfaces 150 each having a tilt angle θ2.

The first, inclined surfaces 151 in the first serrated reflecting surface 71 and the second inclined surfaces 150 in the second serrated reflecting surface 70 are so formed as to be inclined in directions opposite to each other. A direction of inclination of the first inclined surfaces 151 in the first reflecting surface 71 is made to be the same as that of the inclined surfaces in the serrated reflecting surface 20 by the effect of the inclined reflecting surface 63. The tilt angle θ2 is 20°, the tilt angle θ3 is 10°, and the tilt angle θ1 is 20°. With the second inclined surfaces 150 in a lower part of the device being formed in a downward direction, an incident light L3 incoming from a direction forward and obliquely upward of the device is converted into a captured light proceeding in a downward direction, and again converted into a captured light transmitting in an upward direction by being reflected by the reflecting surface 66 in the lower part of the device. Since the first inclined surfaces 151 in the first serrated reflecting surface are formed in a direction as described above, a light transmitted in an upward direction in the light-collecting unit is effectively captured, thus resulting in an increase in a panel brightness. Tilt angles and pitches of the first inclined surfaces 151, the second inclined surfaces 150, and the inclined surfaces 20 are not limited to the values described above. It is preferable that the tilt angles be in the range of 5° to 50°, and it is more preferable that the tilt angles be in the range of 5° to 30°. In particular, it is preferable that the tilt angle θ2 be equal to or smaller than 10°, since the tilt angle θ2 should be determined so that a reflected light from the reflecting surface 66 undergoes total internal reflection. Here, when an expression a tilt angle θ3< a tilt angle θ1 is satisfied, the captured light can be efficiently transmitted to the second light-collecting unit 61. In addition, on one hand, the larger the area of the second serrated reflecting surface 70 is, the more the light from a forward and obliquely upward direction can be captured. On the other hand, the large the area of the first serrated reflecting surface 71 is, the more the light from a forward and obliquely downward direction can be captured. Since much of the light is incident from a forward and obliquely upward direction under normal use, it is generally preferable that an area of the second serrated reflecting surface 70 is larger than an area of the first serrated reflecting surface 71.

Although some of the foregoing examples describe such a device in which the transmitting light coming out of the light-guiding unit is guided to the back of the liquid crystal panel, the present invention is not limited thereto. A liquid crystal device according to the invention may be configured such that a light guiding plate is disposed in front of the liquid crystal panel so that the transmitting light is guided to the light guiding plate and then emitted from the liquid crystal panel. By employing such a configuration, a reflective-type liquid crystal panel can be used for the device.

In addition, although some the foregoing examples describe such a device in which a serrated reflecting surface is provided on a surface opposite to the outward surface of the second light-collecting unit, the present invention is not so limited. In place of the serrated reflecting surface, a flat reflecting surface downwardly inclined towards the light-guiding unit may be employed.

As has been described thus far, according to the present invention, a component corresponding to a conventional light-collecting unit is separated into two sections each having a different function (i.e., a light-collecting unit for collecting and capturing ambient light, and a light-guiding unit, connected to the light-collecting unit, for guiding the light to a liquid crystal display panel). Accordingly, an occupied area of the light-collecting unit is enlarged, and an increased brightness is thereby achieved.

Although the present invention has been fully described by way of examples with reference to the accompanying drawings, it is to be noted the various changes and modification will be apparent to those skilled in the art. Therefore, unless such changes and modifications depart from the scope of the present invention, they should be construed as being included therein.

What is claimed is:

1. A liquid crystal display device utilizing ambient light for illuminating a liquid crystal panel located in a casing, comprising:
   a light-collecting unit for collecting ambient light and converting at least part of the collected ambient light into transmitting light transmitted in said light-collecting unit, and
   a light-guiding unit for guiding the transmitting light to said liquid crystal panel by redirecting a light path of the transmitting light, wherein:
      said light-collecting unit comprises a first light-collecting unit having end faces and located on a face of the casing opposite to a face on which said liquid crystal panel is located, and a second light-collecting unit having end faces and located on an upper face of the casing, wherein
      one of the end faces of said second light-collecting unit is connected to one of the end faces of said first light-collecting unit, and the other end face of said second light-collecting unit is connected to one of the end faces of said light-guiding unit.

2. A The liquid crystal display device according to claim 1, further comprising:
   a flat reflecting surface located at a connecting part of said first light-collecting unit and second light-collecting unit and in an inclined position so that a light from said first light-collecting unit is reflected and guided to said second light-collecting unit.

3. The liquid crystal display device according to claim 1, wherein:
   said second light-collecting unit has a flat transparent outward surface and a flat reflecting surface opposed to the outward surface, said flat reflecting surface downwardly inclined towards said light-guiding unit,
   said first light-collecting unit has a flat transparent outward surface on which ambient light is incident and a first serrated reflecting surface comprising a plurality of first inclined surfaces and a second serrated reflecting surface comprising a plurality of second inclined surfaces, said first and second serrated surfaces both being formed on a surface opposite to the outward surface and said first serrated reflecting surface being disposed upward of said second serrated reflecting surface on the casing, said plurality of first inclined surfaces and said plurality of second inclined surfaces inclined in directions opposite to each other, and
   said plurality of first inclined surfaces and said flat reflecting surface in the second light-collecting unit are commonly inclined towards the light-guiding unit.

4. The liquid crystal display device according to claim 1, wherein:
   said second light-collecting unit has a flat transparent outward surface and a flat reflecting surface opposed to the outward surface, said flat reflecting surface downwardly inclined towards said light-guiding unit, and
   said first light-collecting unit has a flat transparent outward surface and a flat reflecting surface opposed to the outward surface, the flat reflecting surface inclined so that a thickness of said first light-collecting unit is gradually reduced towards a top of the casing.

5. A liquid crystal display device for utilizing ambient light for illuminating a liquid crystal panel located in a casing, comprising:
   a light-collecting unit for collecting ambient light and converting at least part of the collected ambient light into transmitting light transmitted in said light-collecting unit, and
   a light-guiding unit for guiding the transmitting light to said liquid crystal panel by redirecting a light path of the transmitting light, wherein:
      said light-collecting unit comprises a serrated reflecting surface located on a surface of the light-collecting unit opposite to an outward surface of the light-collecting unit on which the ambient light is incident, wherein:
      said light-collecting unit comprises a first light-collecting unit having end faces and located on a face of the casing opposite to a face on which said liquid crystal panel is provided, and a second light-collecting unit having end faces and located on an upper face of the casing, wherein
      one of the end faces of said second light-collecting unit is connected to one of the end faces of said first light-collecting unit, and the other end face of said second light-collecting unit is connected to one of the end faces of said light-guiding unit.

6. The liquid crystal display device according to claim 5, further comprising:

a flat reflecting surface located at a connecting part of said first light-collecting unit and second light-collecting unit and in an inclined position so that a light from said first light-collecting unit is reflected and guided to said second light-collecting unit.

7. The liquid crystal display device according to claim 5, wherein:

said serrated reflecting surface in said first light-collecting unit has a first serrated surface comprising a plurality of first inclined surfaces and second serrated reflecting surface comprising a plurality of second inclined surfaces, said plurality of first inclined surfaces and said plurality of second inclined surfaces inclined in directions opposite to each other, said first serrated reflecting surface being disposed upward of said second serrated reflecting surface on the casing, said serrated reflecting surface in said second light-collecting unit comprises a plurality of inclined surfaces, and said plurality of first inclined surfaces in the first light-collecting unit and said plurality of inclined surfaces in the second light-collecting unit are commonly inclined towards the light-guiding unit.

8. The liquid crystal display device according to claim 5, wherein:

said second light-collecting unit has a flat transparent outward surface and said serrated reflecting surface, and said first light-collecting unit has a flat transparent outward surface and a flat reflecting surface opposed to the outward surface, the flat reflecting surface inclined so that a thickness of said first light-collecting unit is gradually reduced towards a top of the casing.

9. A liquid crystal display device for utilizing ambient light for illuminating a liquid crystal panel located in a casing, comprising:

a light-collecting unit for collecting ambient light and converting at least part of the collected ambient light into transmitting light transmitted in said light-collecting unit, and a light-guiding unit for guiding the transmitting light to said liquid crystal panel by redirecting a light path of the transmitting light, wherein:

said light-collecting unit comprises a serrated reflecting surface provided on a surface of the light-collecting unit opposite to an outward surface of the light-collecting unit on which the ambient light is incident, wherein said serrated reflecting surface comprises a plurality of inclined surfaces in which a tilt angle thereof is varied.

10. The liquid crystal display device according to claim 9, wherein:

said tilt angle is in the range of 5° to 50°.

11. A liquid crystal display device for utilizing ambient light for illuminating a liquid crystal panel provided in a casing, comprising:

a light-collecting unit for collecting ambient light and converting at least part of the collected ambient light into transmitting light transmitted in said light-collecting unit, and a light-guiding unit for guiding the transmitting light to said liquid crystal panel by redirecting a light path of the transmitting light, wherein:

said light-collecting unit comprises a serrated reflecting surface located on a surface of the light-collecting unit opposite to an outward surface of the light-collecting unit on which the ambient light is incident, wherein said serrated reflecting surface, comprises a plurality of stripe-like lines located on a top surface thereof.

12. The liquid crystal display device according to claim 11, wherein:

each of said plurality of stripe-like lines comprises a V-like shape whose inferior angle faces said light-guiding unit.

13. A liquid crystal display device for utilizing ambient light for illuminating a liquid crystal panel located in a casing, comprising:

a light-collecting unit for collecting ambient light and converting at least part of the collected ambient light into transmitting light transmitted in said light-collecting unit, and a light-guiding unit for guiding the transmitting light to said liquid crystal panel by redirecting a light path of the transmitting light, wherein:

said light-guiding unit has a flat reflecting surface located on an outward surface thereof and a prism array located on a surface opposite to the outward surface, wherein said light-guiding unit is for guiding the transmitting light from said light-collecting unit to a back of said liquid crystal panel via said prism array for illuminating said liquid crystal from the back of said liquid crystal panel.

14. A liquid crystal display device for utilizing ambient light for illuminating a liquid crystal panel located in a casing, comprising:

a light-collecting unit for collecting ambient light and converting at least part of the collected ambient light into a transmitting light transmitted in said light-collecting unit, and a light-guiding unit for guiding the transmitting light to said liquid crystal panel by redirecting a light path of the transmitting light, wherein:

said light-guiding unit has a flat inclined reflecting surface formed in an area from the outward surface to an end face thereof adjacent to said liquid crystal panel, and said light-guiding unit is for guiding the transmitting light from said light-collecting unit to a back of said liquid crystal panel by reflecting the transmitting light at said reflecting surface so as to illuminate said liquid crystal from the back of said liquid crystal panel.

* * * * *